United States Patent [19]

Merrick

[11] 4,042,923
[45] Aug. 16, 1977

[54] RADAR TRILATERALIZATION POSITION LOCATORS

[75] Inventor: James W. Merrick, El Paso, Tex.

[73] Assignee: Del Norte Technology, Inc., Euless, Tex.

[21] Appl. No.: 622,841

[22] Filed: Oct. 16, 1975

Related U.S. Application Data

[63] Continuation of Ser. No. 420,448, Nov. 30, 1973, Pat. No. 3,918,056, which is a continuation of Ser. No. 195,687, Nov. 4, 1971, Pat. No. 3,810,179.

[51] Int. Cl.² .......................... G01S 9/02; G06F 11/00
[52] U.S. Cl. ..................... 343/6.5 LC; 340/146.1 BA; 343/5 DP; 343/6.5 R; 343/15
[58] Field of Search ........... 343/6.5 R, 6.5 LC, 5 DP, 343/17.1 PF, 15; 340/146.1 BA

[56] References Cited

U.S. PATENT DOCUMENTS

| | | | |
|---|---|---|---|
| 3,530,470 | 9/1970 | Sheftelman et al. | 343/6.5 LC |
| 3,690,767 | 9/1972 | Missio et al. | 356/5 |
| 3,772,693 | 11/1973 | Allard et al. | 343/6.5 LC |
| 3,810,179 | 5/1974 | Merrick | 343/5 DP |

OTHER PUBLICATIONS

Skolnik, *Radar Handbook*, 1970, p. 37-7.

*Primary Examiner*—S.C. Buczinski

[57] ABSTRACT

A radar position locator system uses a mobile and at least two stationary transceivers. The signals are validated by being stored and compared with previously received signals. If the comparison indicates that the received signal is within a range of a reasonably possible change, as compared to the previously received signals, it is accepted. Otherwise, it is rejected and the memory circuit which stored the signal for validation is backed up to the last previously stored valid signal. The stationary transceivers function somewhat as a surveyor's bench mark. Each transceiver is individually identified by a coded stream of radar pulses, as, for example, a stream of pulses transmitted at a predetermined transceiver identifying pulse repetition rate. A selected number of validated radar signals are transmitted between the mobile and stationary transceivers. The round trip transmission times of several of these signals are averaged, and a digital read out indicates the distance represented by such averaging.

8 Claims, 6 Drawing Figures

LOGICAL BLOCK DIAGRAM

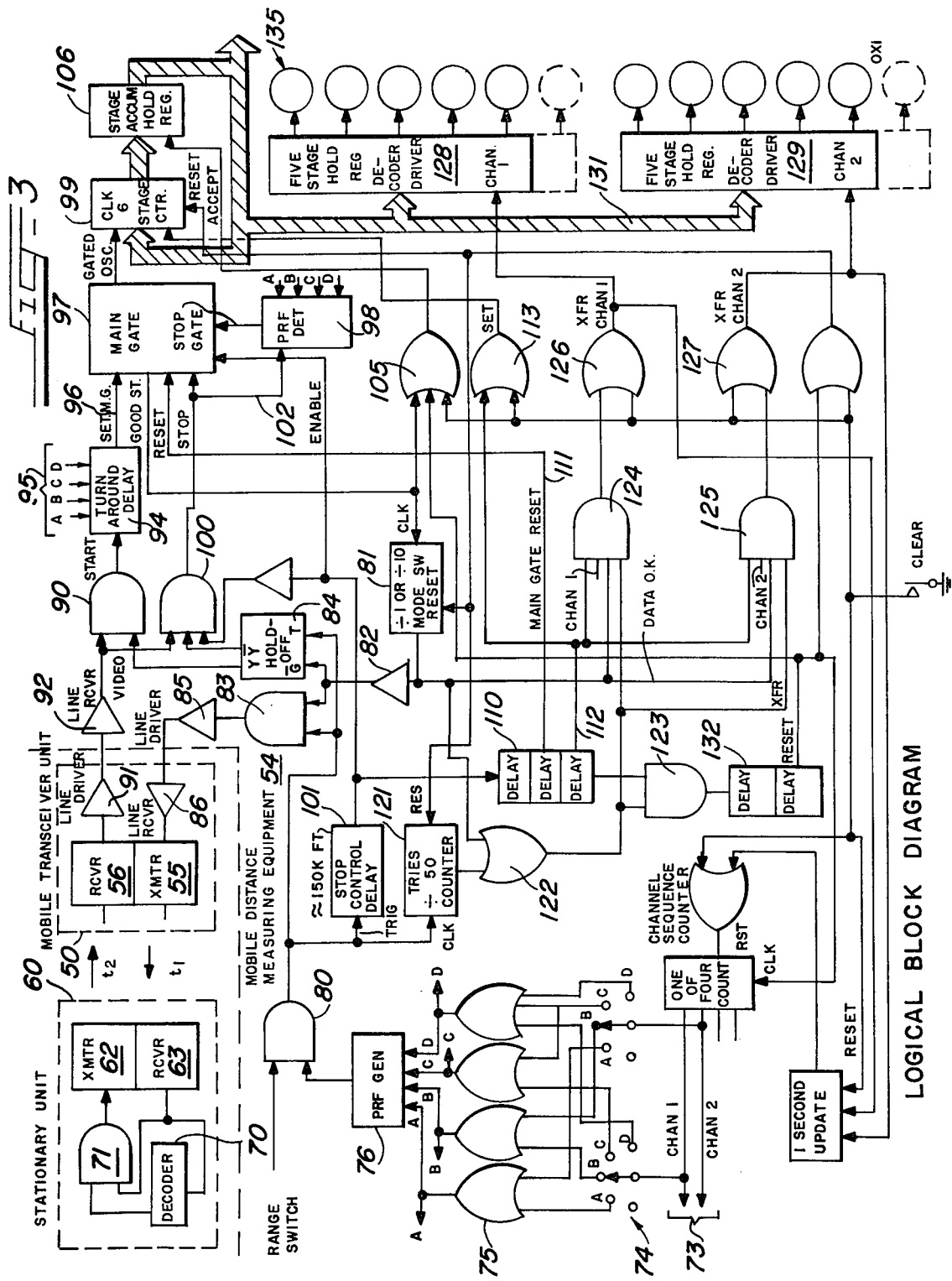

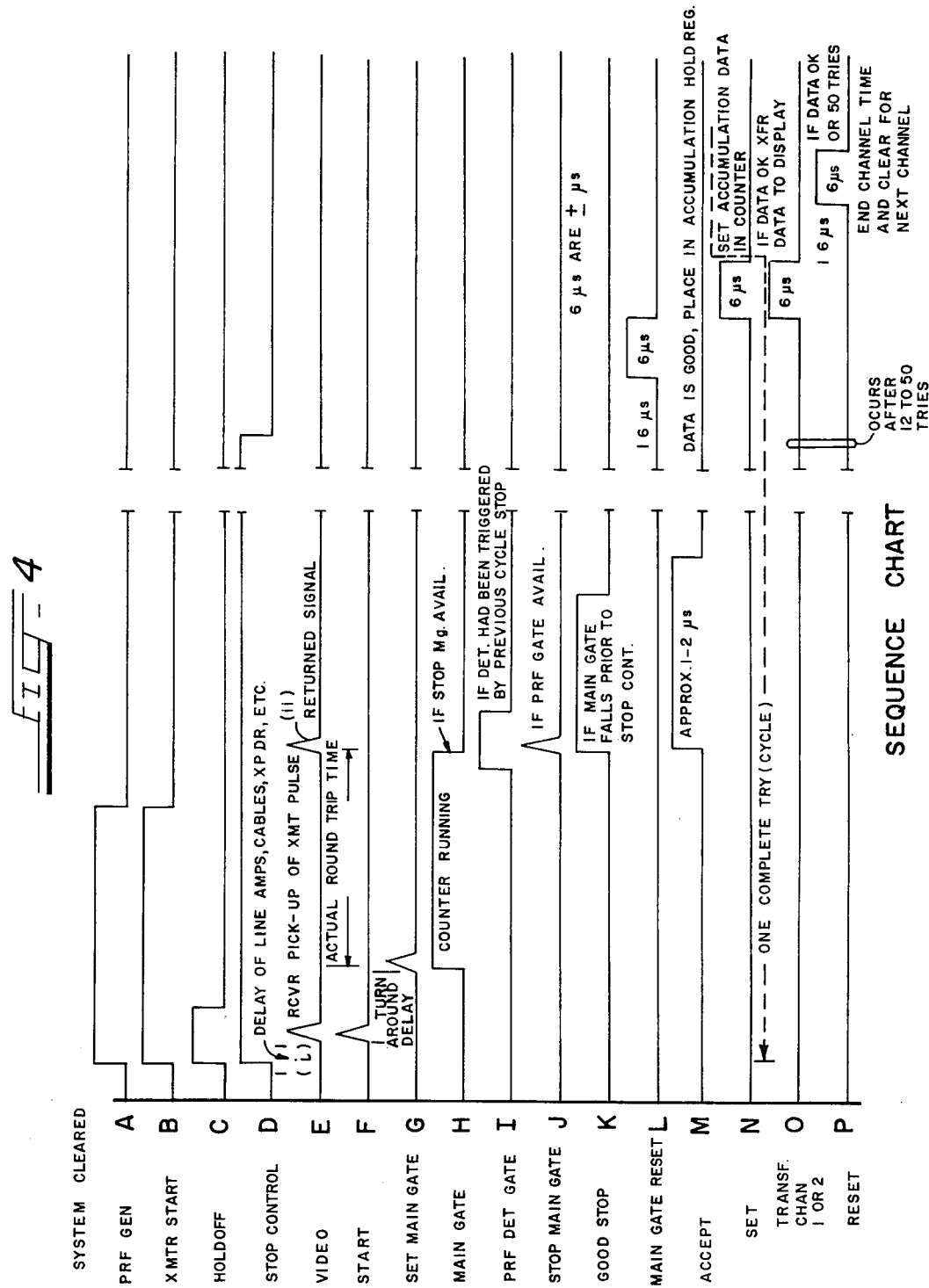

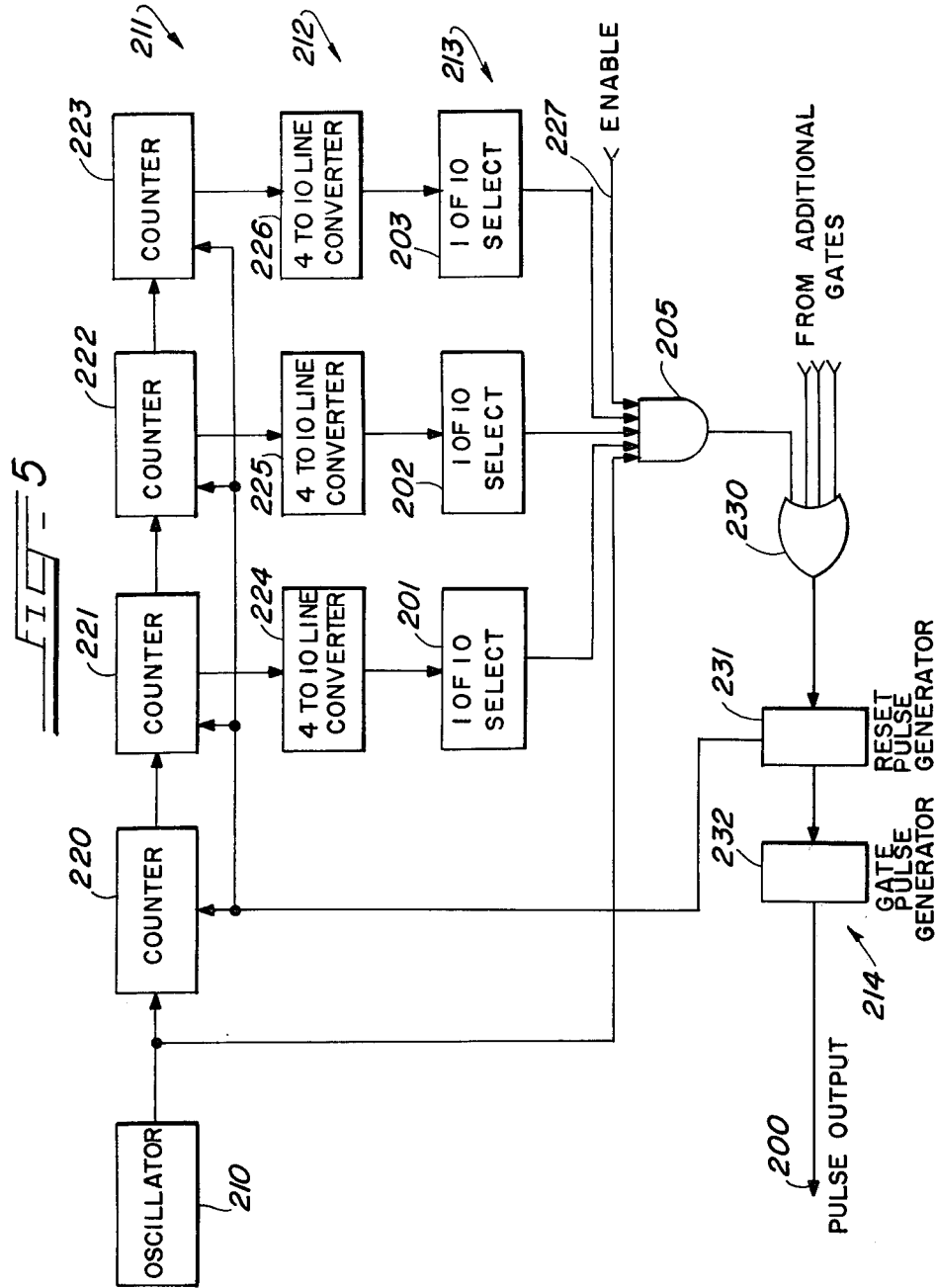

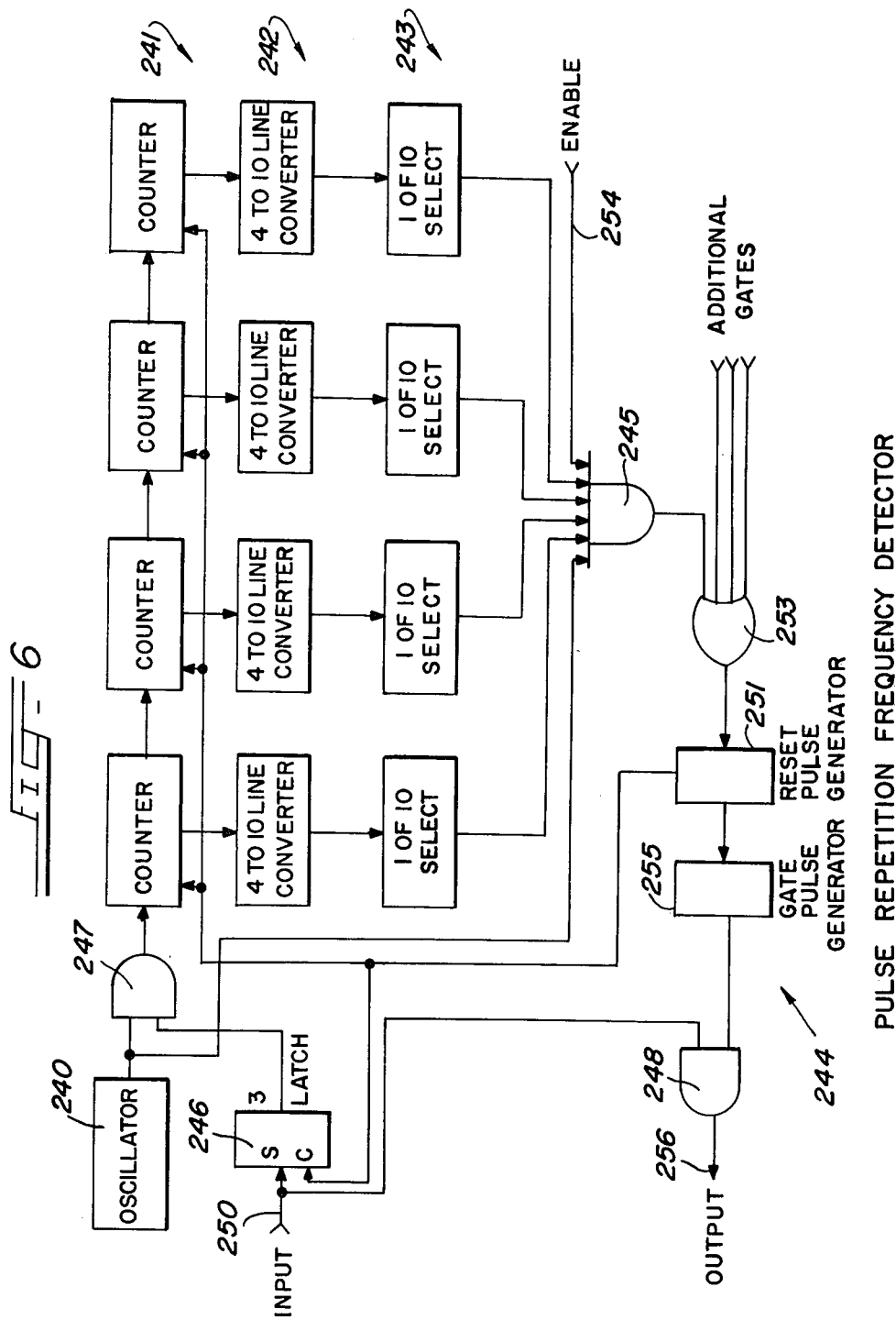

RADAR TRILATERALIZATION POSITION LOCATORS

This is a continuation of application Ser. No. 420,448, filed Nov. 30, 1973, now U.S. Pat. No. 3,918,056 issued Nov. 4, 1975, which is a continuation of application Ser. No. 195,687 filed Nov. 4, 1971, now U.S. Pat. No. 3,810,179.

This invention relates to electronic, trilateralization, position locators and more particularly to radar systems and methods for precisely locating the position of mobile transceivers.

The term "trilateralization" indicates that measurements are taken by finding the lengths of three sides of a triangle; or, no angles or bearings are required to find a position.

Radar systems of the described type provide general purpose tools by means of which one may find and measure distances for many different purposes. For example, ships, helicopters, motor vehicles, and the like, may find their way over predetermined paths and through hazardous areas. Oil drilling barges or platforms may be precisely anchored in a desired spot. Any drift caused by tides and currents may be detected. Still other uses and purposes will readily occur to those who are skilled in the art.

Several well known phenomena affect the accuracy of the described type of radar distance measuring and position locating devices. Among other things, these phenomena include a loss of line-of-sight transmission, a reflection and transmission path coincidence which causes signal cancellation, an inadequate antenna pattern for a given location, extremely high levels of interference, out-of-reliable-range transmission, and weather interferences. Obviously, a helicopter pilot, for example, would be in a better position if he receives no signal than he would be in if he received a wrong signal. Therefore, the distance measuring system should detect and reject the measurements in each of these and similar situations of unreliability.

Accordingly, an object of this invention is to provide new and improved radar transmission and location equipment. Here, an object is to provide a very low-cost, higly reliable radar system. In this connection, an object is to reject all false or unreliable signals which could mislead the operator. Another object is to obtain reliability through an averaging of the travel time of many transmission path lengths, which is verified by a comparision with data which was previously transmitted, received, and stored. More particularly, an object is to provide a high degree of accuracy of range resolution.

Another object of the invention is to provide small and transporatable radar units which do not require substantial amounts of field maintenance. A further object is to provide units which are safe to use.

In keeping with an aspect of the invention, these and other objects are accomplished by a system having two stationary radio frequency transceiver units which are precisely located, much as a surveyor's bench mark is located. A mobile transceiver unit may move, at speeds in the order of one hundred miles per hour or less, through the area covered by the ratio frequency signals transmitted from the stationary bench mark units. Equipment associated with the mobile transceiver then utilizes a trilateralization technique to fix its location with respect to the signals received from the bench mark units.

The advantages of the inventive system provide position and location readings with great accuracy, rejection of interference signals, and preclusion of false readings responsive to transmission distortions. Among other things, these advantages are realized by radar operation in the X-band, wherein encoded energy is transmitted from the mobile transceiver unit to the stationary transceiver units. The stationary unit monitors and decodes all signals as they are received, and when it detects its particular code, an encoded signal is returned from the stationary unit to the mobile unit. For reliability, two entirely separate channels are preferably used between the mobile and two or more stationary units, thus providing two distances which make the trilateralization possible, since the distance between the stationary units is known.

The time required for the signals to make a round trip is an indication of the distance between the mobile and stationay units. Moreover, the encoding of the signals precludes interference from other near-by radar systems which respond to different codes. If the interference from near-by radar systems should become too great for the encoding capabilities of the system, the mobile unit gives a non-operative signal, since no signal is better than a false signal.

It is thought that a preferred embodiment for accomplishing these and other objects will be understood best from the following description, when read in connection with the accompanying drawings, in which:

FIG. 1 is a block diagram of the inventive system including a first or mobile unit and two other or stationary units, used for making a triangulation measurement;

FIG. 2 schematically represents the use of the inventive system with respect to an exemplary ship-to-shore location;

FIG. 3 is a logic diagram of the circuitry in the mobile stationary units,

FIG. 4 is a sequence chart showing pulses and waveforms which appear in the circuit of the logic diagram of FIG. 3;

FIG. 5 is a logic circuit showing the encoder; and

FIG. 6 is a logic circuit showing the decoder.

Figure 1:
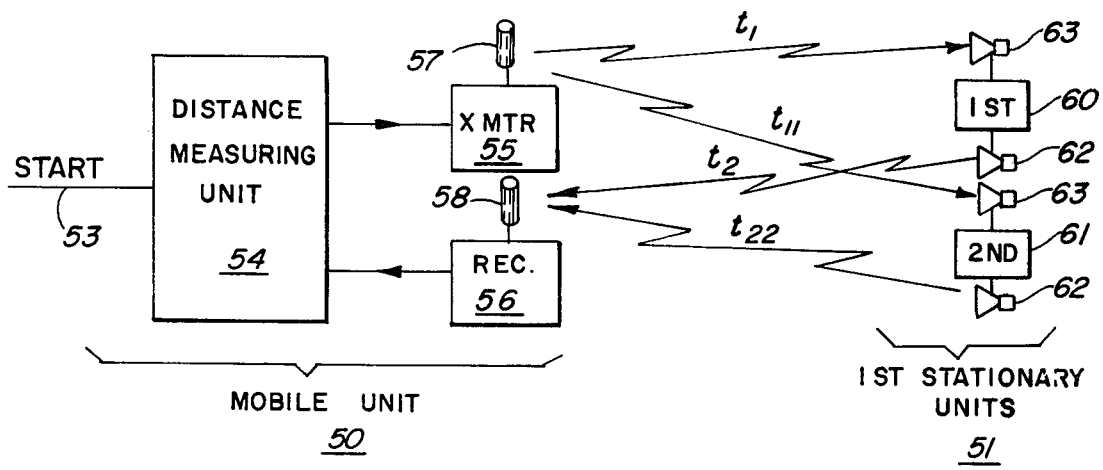

The principal units in the inventive radar system are disclosed in FIG. 1 as a first or mobile unit 50 and at least two other or stationary units 51. The mobile unit may be located on a sea, land, or air vehicle; or it could be hand carried. It includes suitable controls symbolically indicated by a start wire 53, a distance measuring unit 54, and a transceiver or transmitter-receiver combination 55, 56. The transceiver drives any suitable omnidirectional antenna means, here symbolically shown as transmit and receive antennas 57, 58. However, it should be understood that either a single antenna or a pair of antennas may be used and that a slotted array is preferred.

The stationary units include transceivers or transmitter and receiver combinations 60, 61, each having an associated antenna means, here shown symbolically as transmit and receive antenna horns 62, 63, respectively. Again, separate transmit and receive antennas are shown for convenience of description only. A single antenna is preferably used at each stationary unit. Preferably, these antennas are directional horns; however, slotted arrays may also be used for the stationary unit. Two X-band channels may be used to separate the transmission between the mobile unit 50 and each of the two stationary units 51. The transmit and receive radio frequency links between the mobile and the first stationary unit 60 are here designated $t_1$, $t_2$, and the comparable links to the second unit 61 are designated $t_{11}$, $t_{22}$. Since the units 60, 61 function as bench marks and since line-of-sight transmission is used, units 60, 61 are preferably placed as high as possible above the ground.

The radio frequency links and the associated antenna may have many suitable characteristics. However, a typical unit might, for example, use 9350 MHz at the mobile unit 50 and 9450 MHz at the stationary units 51, or a wave length in the order of 3.2 cm. A typical pulse has a pulse length of perhaps 0.5 $\mu$s and a variable pulse repetition rate of, say, 26 to 1000 pulses per second. The preferred horizontal mobile antenna pattern is 360°, and the stationary antenna pattern is about 45°. The vertical pattern may be approximately 15° at the mobile unit and 5° at the stationary units, with measurement being made at the half power points. Other suitable antenna patterns may be used for special purposes.

Figure 2:
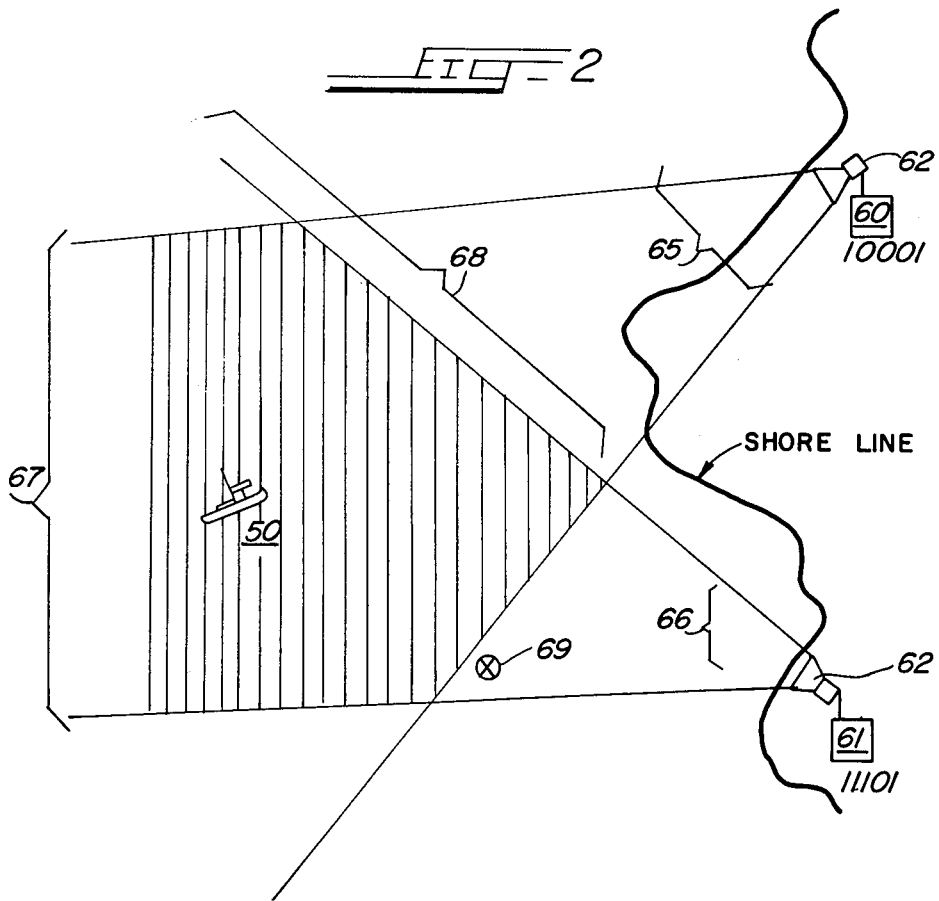

In operation (FIG. 2), the horn antennas of the stationary units 60, 61 are oriented to direct their horizontal patterns toward the mobile unit 50. Thus, the antenna patterns 65, 66 of the stationary units 60, 61, respectively, overlap in the area 67, 68 which is cross-hatched for easy identification. The mobile unit 50 may move anyplace within this area and obtain reliable line-of-sight radar transmission.

If the mobile unit 50 moves outside of the cross-hatched area, as to point 69, for example, it loses line-of-sight transmission with the stationary unit 60. Nevertheless, it may be possible that the transmission may continue between units 50 and 60. However, the apparent distance measurement would lose reliability, and the received signal would have an error. Hence, this measurement must be rejected, and an alarm or loss of RF link signal should be given. The mobile unit could then make contact with another stationary unit (not shown) having line-of-sight transmission to the point 69.

According to the invention, each of the stationary units 60, 61 has a code assigned thereto for the purpose of identifying it. The mobile unit 50 may send interrogation signals in the form of a code identifying any particular stationary unit in the area. When that identified stationary unit detects its incoming code, it replies preferably by returning the same code. When the mobile unit 50 detects the return of the reply code, which is the code it sent out, it accepts it and gives a read out of the time required for the round trip of interrogation and reply codes, in terms of distance.

For example, the invention uses a very simple form of encoding by changing the pulse repetition rate of the interrogation signal. However, for convenience of description, the stationary unit 60 is here arbitrarily shown as responding to the receipt of the code designated 10001, and the stationary unit 61 responds to the receipt of code 11101. By way of example, each unit may be adapted to transmit pulses in bursts, having five pulse positions per burst. Thus, the unit 60 may respond to the receipt of two pulses in the first and fifth pulse positions, and the unit 61 responds to the receipt of four pulses in the first, second, third, and fifth positions. Other suitable encoding techniques may also be used.

However, the conventional encoding techniques are not as low-cost as the inventive technique. More particularly, a system using a coded sequence of pulses, as described above, requires each pulse to be spaced in time farther from its adjacent pulses than the time required for two-way RF travel of the radar energy. Each transponder using such a coding technique must include a pulse sequence decoder which causes it to transmit a reply pulses immediately upon receiving the appropriate pulse in the transmitted sequence. This technique requires precisely synchronized clocks at each station, and there is a need to generate pulse code sequences at the remote or stationary stations. Thus, systems using such conventional codes require precision clocks which are expensive and troublesome.

Moreover, the inventive system using pulse repetition rate encoding has a much greater ability to reject interference, due to the extremely narrow window of response time, which is much shorter than the RF travel time. Moreover, multiple replies from each transponder make for easy data processing.

More particularly, the mobile unit 50 repeatedly transmits a radar signal, in the form of a packet of energy encoded by the pulse repetition rate, and each of the stationary units 60, 61 receives such signal. The signal is decoded by simply adjusting the appropriate stationary unit to accept only a pulse stream with a predetermined repetition rate while rejecting all other signals. When the properly coded signal is received, the stationary unit returns a packet of energy responsive to every packet which it receives. Thus, the returned signals have the repetition rate of received signals.

The time $t_1 + t_2$ (plus the turn around time required to process the signal in the stationary unit), shown in FIG. 1, indicate the time required for a round trip of an interrogation pulse and a rely pulse between units 50 and 60. Since the transmission velocity of RF energy in the atmosphere is known, and since the turn around time is known, the unit 54 may give a read out of the time required for a round trip, with the read out stated in terms of distance. If the area contains so many transmitters and receivers that excessive interference occurs, the units detect an invalid code, which is reject, and an alarm or loss of RF link signal is given, FIG. 3 is a logical circuit diagram of the mobile stationary unit and FIG. 4 is a graphical showing of a sequence of events occurring in the circuit of FIG. 3.

The major divisions of the logic diagram are a stationary unit 60, mobile transceiver 55, 56, and mobile distance measuring unit 54. The RF links are indicated at $t_1$, $t_2$. The function of the stationary unit 60 is to receive all pertinently encoded interrogation signals which are transmitted in the area. Each signal picked up at receiver 63 is sent to a pulse repetition frequency detector 70 (shown in detail in FIG. 6) and to an AND gate 71 (which may be the AND gate 248 in FIG. 6). If the received signals correspond in time to the desired decoded signal, the AND gate 71 conducts and triggers the transmitter 62. Thus, the stationary units send out their signals responsive to the received signal without requiring complex local clocks and encoders.

The function of the mobile unit transceiver 50 is to trigger the transmitter 55 for sending an interrogation signal, as indicated at $t_1$, and to accept at receiving unit 56, the encoded reply signals, as indicated at $t_2$.

The functions of the distance measuring unit 54 are to: (a) establish an RF link with a stationary unit, (b) validate the apparent range data, (c) accumulate apparently validated range data, (d) transfer the accumulated data to a read out unit, and (e) send repeated data or standby, as requested.

In view of this background information, it is thought that the invention will be understood best from the following description of the logic circuit operation.

Initially, the system is cleared. Then, an RF link channel is selected and activated by control signals which are selectively applied to the two or more channel selecting conductors 73 (lower left part of FIG. 3). A switch 74 is set to select a desired code for identifying a particular stationary unit. Responsive jointly to the signal on the selected channel identifying wire 73, and to the position of the switch 74, an OR gate (such as 75) conducts to trigger control a pulse repetition frequency generator 76 in a particular manner as is indicated by the graph in line $a$ of FIG. A. The details of this generator are found in FIG. 5. Thus, for example, an A signal switch setting could cause the generator 76 to transmit pulses at a first repetition rate, a B switch setting could cause a transmission of pulses at a second repetition rate, etc. In this manner, the generator 76 may transmit a stream of signals with a particular pulse repetition rate which acts as a code that identifies a particular stationary unit (FIG. 4B).

According to the invention, an operator decides upon a range of operation and the number of validated signals which are required to produce an acceptble measurement. Then, the operator makes suitable switch adjustments to implement this decision. Among other things, a mode switch or counter 81 is set to require a predetermined number of successful acceptances of reply signals. After the switch setting, there are coincidences at the input of the AND gate 80 each time that the generator 76 produces a pulse. These pulses coordinate both the transmission of the interrogation radar pulse and the reception of the reply radar pulse. Also, these switch adjustments reset all counters to a zero position. A mode switch 81 is operated to energize a driver 82 to establish the number of apparently validated reply signals that are required.

The output of the driver 82 energizes one input of an AND gate 83 and a hold-off circuit 84 (FIG. 4C). The outputs of AND gate 80 and driver 82 coincide at the inputs of AND gate 83. As a result, the interrogation pulses generated at 76 are fed through drivers 85, 86 to cause the mobile transmitter 55 to send a packet of radar energy to the unit 60.

At the same time, the outputs of the AND gate 80 and driver 82 start a time period (FIG. 4C), measured by hold-off circuit 84, which controls AND gate 90 on and AND gate 100 off. When transmitter 55 fires, receiver 56 picks up the firing (commonly termed "main bang"). This signal [FIG. 43(i)] is fed through line driver 91 and line receiver 92, and is gated at AND gate 90 with hold-off circuit 84 to form the start signal (FIG. 4F).

Means are provided for delaying the effect of the start signal for a period of time equal to the internal turn around time required for unit 60 to respond to the interrogation pulse by transmitting a reply pulse. More particularly, responsive to the resulting output of the AND gate 90, a turn around delay timer 94 is triggered. This timer 94 also has a marking at 95 which indicates the selected setting of the pulse repetition rate switch 74. As a result, the timer 94 measures a period of time which is equal to the turn around time within the stationary unit 60 (i.e., the time difference between FIGS. 4F and 4G). Stated another way, the timer 94 measures a period of time equal to the elapsed time beginning with the receipt of a signal at stationary receiver 63 and continuing through the decoding at 70, the AND gate 71 response time, and the transmitter 62 reaction. After the termination of this period of time, the timer 94 gives an output signal at 96 (FIG. 4G) to set a main gate circuit 97, and start the measuring period until the next response.

Among other things, this main gate circuit 97 and its associated clock 99 include a high frequency crystal controlled oscillator, preferably running at a known speed, such as one-tenth or one-twentieth of the velocity of propagation of radio energy. This way, the time consumed for a round trip of the radar pulse may be found by a simple multiplication converted to distance. There is no need for complex computation circuits, as there would be if the clock frequency were some odd value, with respect to the speed of light. By counting the cyclically recurring output pulses from the clock, it is possible to make a precise measurement of time. For this purpose, the clock output pulses are fed into a six-stage counter in circuit 99.

At the end of the output pulse from the generator 76, the AND gate 80 turns off, as does the gate 83. Responsive to the end of the hold-off period (FIG. 4C) the enabling signal is removed from the lower input of the AND gate 90, and an enabling signal is applied to the center input of the AND gate 100. The lower input of the AND gate 100 is energized from a stop control timer 101 (FIG. 4D). This timer is triggered by the initial output from the gate 80, and it automatically continues to give an output signal for an extended period of time thereafter. The primary purpose of this output signal is to enable the main gate circuit 97 to detect valid signals, and thereafter to inhibit further response to random noise signals.

Responsive to the second and following radar unit 60 re-transmits a signal to the receiver 56 [FIG. 4E(ii)]. The signal from the receiver 56 is applied through the drivers 91, 92. The output of the driver 92 appears at the input of the gate 100, which gives an output stop signal (FIG. 4J).

The stop signal is fed into the main gate 97 and over wire 102 to the detector 98, where it starts a decoder (FIG. 6), which started on a previously transmitted signal (12) received by the transceiver 56. Assuming that a valid code is received at the proper pulse repetition time, the counting detector 98 (FIGS. 4I and 4J) marks a stop gate terminal in the main gate circuit 97, thereby stopping the out-pulsing of the clock to its associated counters 99. The main gate circuit 97 is reset, and the counting in detector 98 is stopped.

Therefore, the count in circuit 99 is an indication of the time required for a radar signal to make a round trip from transmitter 55 to receiver 63 and from the transmitter 62 to the receiver 56. The turn around time which occurs inside the stationary unit 60 is removed from the count by the delayed start caused by the circuit 94, as indicated in FIGS. 4F and 4G.

When the main gate circuit 97 stops, a "good stop" signal (FIG. 4K) is sent through the OR gate 105 to an accumulation register circuit 106. Responsive thereto, the register 106 accepts a transfer of the initially stored in the counter circuit 99. The "good stop" signal is also applied to the mode switch 81 which stores a memory that one of the prescribed number of good readings has been obtained.

Means are provided for evaluating the received signal and for rejecting such received signal responsive to the detection of an apparently invalid signal. More particularly, the next event depends upon the preceding events. The operator set the mode switch 81, when the distance measurement began, in order to fix the desired degree of resolution. At one extreme, it is only necessary to receive one distance measurement, which is assumed to be correct. At the other extreme, many distance measurements are made and an average of the many measurements is taken. For example, the system may attempt to make any number of measurements (such as fifty) — rejecting apparently bad readings — or until a total of, say, ten apparently good readings have been received and averaged. A further embodiment might be such that on each reading, the accumulator register 106 compares the present reading which it is receiving with the past readings stored there, rejecting inconsistent readings which are apparently invalid readings.

Means are provided for repeatedly re-transmitting the interrogation radar signals until a selected number of apparently valid reply signals have been received. In greater detail, each time that the gate 80 conducts to cause a transmission of a packet of radar energy to the stationary unit 60, that pulse from gate 80 also steps a "tries" counter 121 to store a memory that an attempt has been made to obtain a valid reading. If this counter 121 reaches a "50" count, it out-pulses into an OR gate 122 to stop the measurements, regardless of whether there have or have not been the required number of successful tries. Therefore, this counter limits the system to a maximum of 50 tries and prevents endless operations.

On the other hand, if ten good readings, for example, are obtained before the count of 50 tries is reached, the mode switch counter 81 receives 10 "good stop" pulses, and sends a signal to the OR gate 122. Nothing further happens until the stop control timer 101 times out to remove an enabling signal from the main gate circuit 97. Also, the stop control circuit 101 triggers a delay line 110 to initiate a reset cycle.

As the reset signal moves down the delay line 110, a signal appears on line 111 to reset the main gate circuit 97. A signal from the delay line 110 (FIG. 4N) next appears on wire 112. Responsive thereto, the OR gate 113 conducts and causes the register 106 to out-pulse to the counter 99. There should be no effect, since the counter 99 should have stopped previously when it initially stored data, and its setting should have been transferred into the accumulation register 106. On the other hand, if the signals were ambiguous or if the counter did not stop, the counter 99 changes state back to the previous good data responsive to the output from the OR gate 113. Thus, bad or invalid signals are rejected.

Finally, the delay line 110 out-pulses to the right-hand terminal of the AND gate 123. There is a coincidence with the OR gate 122 signal at the input of the AND gate 123 when the pulse in the delay line 110 reaches the end of the line. Thus, the AND gate 123 out-pulses either when the mode switch 81 pulses OR gate 122 after ten good measurements are received, for example, or when the tries counter 121 pulses the OR gate 122 after a total of fifty attempts have been made. If the mode switch is set to require some other degree of resolution, the count is stopped after any other convenient number of good measurements have been received. The precision of the distance measurement thus depends, at least in part, upon the number of readings which are averaged in the accumulation counter 106, and that number depends upon the setting of circuits 81.

Means are provided responsive to the accumulation of a predetermined amount of acceptable data for giving a read out of the average of such accumulated data. More particularly, as each count is completed during the ten successful tries, for example, the counter 99 transfers its count to the register 106, where the successive good counts are accumulated and averaged. After the last of the prescribed number of successful counts is completed, according to a mode switch 81 control exercised via circuit 124, the register 106 transfers its stored data to an appropriate five- or six-stage read out register 128 (FIG. 4N).

When the pulse in the delay line 110 appears on the wire 112 after the count is completed, either of the AND gates 124, 125 conducts, depending upon whether channel 1 or channel 2 is then active (i.e., which of the wires 73 is marked). Responsive thereto, either of the OR gates 126, 127 conducts to transfer the accumulated count from the register 106 to one of the registers 128, 129, again depending upon which of the channels is in use.

The conditions for this transfer are fixed by the coincidence of signals appearing at the inputs of the AND gates 124, 125. The upper inputs to each of these gates are marked when the pulse in the delay line 110 marks the lead 112, to indicate the end of the cycle. The second from the top input is marked according to the channel, selected at wires 73, and used to transmit radar signals to a stationary unit. The second from the bottom inputs to the AND gates 124, 125 are marked when a good stop is detected by the main gate circuit 97 and pulses the mode switch 81 at the end of the selected number of successful counts. If the tries counter 121 reaches a count of fifty or if the mode switch 81 reaches the prescribed count of good tries (e.g., 10 successes), the lower input is pulsed at the AND gates, 124, 125. When these four AND gate input signals coincide, they indicate that the prescribed number of valid measurements have been received for a particular channel (or stationary unit).

Means are provided for transferring data which is apparently good and for rejecting non-consistent, apparently bad data. More specifically, if a good stop signal does not trip the mode circuit 81 on the fiftieth try, the second from the bottom input of the AND gates 124, 125 will not be marked to allow a transfer of data from the circuit 106 to the registers 128, 129. Thus, if there are not the ten or so good counts selected by the counter 81, it is not possible to transfer the count in the absence of a good stop signal.

The pulse from the OR gates 126, 127 is an enable pulse. The actual data transfer (FIG. 4-O) is completed over the data busses 131. The transferred data is thereafter displayed at 135, or printed out by a teleprinter, preferably in terms of distance.

After the cycle of data transfer is complete, the AND gate 123 pulses a delay line 132, to initiate a completion of the reset cycle (FIG. 4P).

Means are provided for encoding the transmitted signal pulse repetition rate responsive to the counting of cyclically recurring clock pulses. More particularly, FIG. 4 shows a pulse repetition frequency generator 76 for generating pulses at a selected rate which is the code that identifies a called stationary unit. The detector 98 responds to the pulses having the selected rate. The stationary unit 60 includes similar circuits. The details of these generator and detector circuits 76, 98 are shown in FIGS. 5, 6, respectively.

Briefly, a pulse repetition generating means, responsive to the output of a crystal controlled oscillator, provides an output train of pulses at the output terminal 200 (FIG. 5) with a selected pulse repetition rate. The time period between the pulses in this train may be selected and controlled with a high degree of precision by the disclosed circuits. The exact interpulse period is determined by selecting an appropriate output at each of three one-of-ten selectors 201, 202, and 203. While these three selector circuits are shown in FIG. 6, it should be understood that any convenient number may be used. The select circuits may be switches, wire jumpers, or electrically controlled gates or relays.

In general, the interval between the output pulses is determined by counting discrete time periods which may be the output cycles of a crystal oscillator. After the desired total number of periods have been counted, as determined by the selectors 201, 202, 203, the counter is reset to zero, and upon reset termination one output pulse is generated to transmit a radar signal at the transmitter 55 (FIG. 3). The cycle then repeats, and another radar signal is transmitted.

To change the selected repetition rate, it is only necessary to change the adjustment of the selectors 201, 202, 203. Or, an alternative is to disable the AND gate 205 by removal of a signal from the enable wire 227, and switch to another and similar AND gate with different selector inputs by marking another enable wire. This method enables the generation of precisely timed trains of radar signals.

In greater detail, the major parts of the generator 76 are preferably a quartz crystal controlled clock pulse oscillator 210, a series of counters 211, a decoding or count conversion circuit 212, a selector circuit 213, and output circuitry 214. The oscillator 210 may have a cyclic output waveform of any suitable wave shape, such as a sinusoidal wave or a series of pulses. In either event, the wave or pulses form a series of positive or negative signals which may be counted at 211, in either a decimal or binary form.

For example, assuming that the clock pulse oscillator 210 is operating at 1 Megahertz, the first counterstage 220 provides a count in microseconds, the second counterstage 221 counts in tens of microseconds, the third counterstage 222 counts in hundreds of microseconds, and the fourth counterstage 223 counts in milliseconds. Thus, it is here assumed that counters 220-223 represent units, tens, hundreds, and thousands, respectively. More or less counterstages may be provided, as desired.

Each of the counterstages 220-223 provides a four bit binary output which is converted into a decimal or ten signal output by an individually associated 4-to-10 converter 224-226. The outputs of these converters are fed to the associated select circuits 201-203 where any one of the ten output signals may be selected.

Assume, for example, that the desired interval between the output pulses from generator 80 is 5.34 milliseconds. The first or most significant select circuit 203 is switched to select the fifth output signal from converter 226. Select circuit 202 is switched to select the third output signal from converter 225, and select circuit 201 is switched to select the fourth output signal of converter 224. When each 5.34 millisecond period of time has elapsed, the three select circuits 201, 202, and 203 simultaneously provide output signals at the input of AND gate 205. If an enable line 227 is also marked at this time, the AND gate 205 provides an output signal to the OR gate 230.

Responsive thereto, a reset pulse generator 231 outpulses to reset each of the counters 220-223 to zero. Also, the pulse generator 231 pulses generator 232, which triggers the transmission of a functional pulse or a packet of radar energy from the transmitter 55.

Upon reflection, it should be apparent that the outgoing stream of functional pulses or radar interrogation pulses may be transmitted at any convenient pulse repetition rate, and that the rate is an easily changed coded signal.

The detector or decoder circuit (FIG. 6) may be set. The crystal controlled clock pulse oscillator 240, counters 241, converters 242, and selectors 243 are approximately the same as the previously described oscillator 210, counters 211, converters 212, and selectors 213, respectively. The pulse generators 244 are similar to the generators 214. In addition, the detector of FIG. 6 includes an input latch circuit 246 and two AND gates 247, 248, which are not included in the pulse repetition frequency generator of FIG. 5.

In operation, a functional pulse or packet of radar energy is received at the set or S input of the gate 246, and responsive thereto an enable signal is sent to the AND gate 247. The output of the quartz crystal controlled clock pulse oscillator is applied to the counter 241. When the preselected count is reached, the OR gate 253 out-pulses to the reset generator 251, which resets the counters and out-pulses to the gate pulse generator 255.

If the internal count (the count selected at 243) coincides with the functional pulse interval or transmitted code received at input terminal 250, the lower input of the AND gate 248 receives an enabling pulse from the gate pulse generator 255 simultaneously with the receipt of a radar pulse at the input terminal 250. This radar pulse appears at the upper input of AND gate 248, and a valid code signal is sent from output 256. This functional pulse may trigger the transmission of the reply pulse from the stationary unit 60 to the mobile unit 50. Or, if FIG. 6 is used as the detector 98 in FIG. 3, the output at 256 causes a pulse at the "stop gate" input of the main gate circuit 97.

The receipt of the described functional pulse or packet of radar energy at the input 250 also sets the latch circuit 246 which causes the zero reset of the counter 241 to start a new cycle of counting.

An advantage of this encoding technique is that the "window" for the receipt of the second pulse is made very narrow. Hence, there is a great selectivity, thus enabling a high order of discrimination. Another advantage is that the first pulse has no effect except to start the counter. Hence, any lone and random pulses do not trigger a response. Still another advantage of this invention is that the circuit of FIG. 6 may be duplicated many times, and other AND gates (similar to gate 245) may be enabled to change the code, by a selection of a different enabling lead, similar to lead 254.

This system selects the remote stations and rejects noise signals. More particularly, each remote station is identified by a separate pulse repetition frequency. The generator in the mobile station is set at one repetition rate, and each of the detectors in the remote stations detect the rate correctly to see if they are being called. The station then replies by sending one reply pulse responsive to the receipt of each interrogation pulse. The replies are further discriminated in the distance measuring unit of the mobile unit to insure that the proper stationary station is replying. This effectively doubles the rejection of noise in the RF link.

When the desired number of replies is obtained from the first stationary unit, the generator and detector are switched to transmit and accept pulses at the next selected pulse repetition frequency. The stationary unit with the newly selected frequency setting replies. The use of crystal controlled oscillators in both the mobile and the stationary units provides the timing signals, which gives precision pulse spacing and allows gate widths of slightly more than three clock pulse periods.

Upon reflection, it should be apparent that a simple, straightforward, low-cost device has been provided for measuring distances. Accordingly, the attached claims should be construed to cover all equivalent structures.

I claim:

1. Means for validating timed radar signals comprising means for repeatedly storing initial data responsive to transmitting radar signals, data accumulation means, means for transferring said initially stored data to said data accumulator means whereby said accumulator means stores an average of previously received data which was initially stored and then transferred to said accumulator, means in said accumulator for accepting the transferred data which is consistent with previously accumulated data and rejecting data which is non-consistent therewith, means responsive to the receipt of non-consistent data for returning said initial data storage means to a condition wherein it stores the last previously received consistent data, and means responsive to the accumulation of a predetermined amount of said accepted data for giving a read out of the average of said accumulated data.

2. A system for validating repeatedly transmitted information signals which are subject to change in a predictable manner, said system comprising at least two stations, means for repeatedly transmitting said information signals between said two stations, means responsive to the receipt of each of said information signals for initially storing each of said signals as it is received, means for comparing the signal in said initial storage with previously received signals, and signal averaging means for accepting and averaging signals in said initial storage only when said comparing means indicates that said initially stored signal falls within said predictable change as compared to said previously received signals and for returning said initial storage to a previously received information signal responsive to initially stored data which did not fall within said predictable change.

3. The system of claim 2 and means for counting each signal as it is accepted, and means responsive to said counting means reaching a predetermined count for accepting said received signals as valid.

4. The system of claim 3 and means for selecting said predetermined count.

5. The system of claim 3 wherein said signal averaging means comprises accumulator storage means for accepting from said initial storage each information signal as it is accepted, and means for transferring said signals accumulated in said accumulator storage means responsive to counting means reaching said predetermined count.

6. The system of claim 3 wherein one of said stations is an interrogating station for originating said information signals and the other of said stations is a station for responding to said information signals, means in said responding station for replying in kind to each interrogation signal received from said interrogating station, whereby the time required for each interrogation signal to travel from said interrogating station to said responding station and back to said interrogating station indicates the distance between said stations.

7. The system of claim 6 wherein at least one of said stations is mobile whereby said indicated distance may vary only as a function of the possible speed of said mobile station, and means in said interrogating station responsive to each reply signal for accepting said reply signal only if the indicated distance corresponds to the distance indicated by previously accepted reply signals as changed by the possible speed of said mobile station.

8. The system of claim 6 and means responsive to the receipt of each reply signal for measuring a period of time, and means responsive to a failure of said accepting means to accept said reply signal before the end of said measured period of time for rejecting said reply signal.

* * * * *